No. 824,227. PATENTED JUNE 26, 1906.
G. D. BASSE.
TRELLIS.
APPLICATION FILED DEC. 16, 1905.
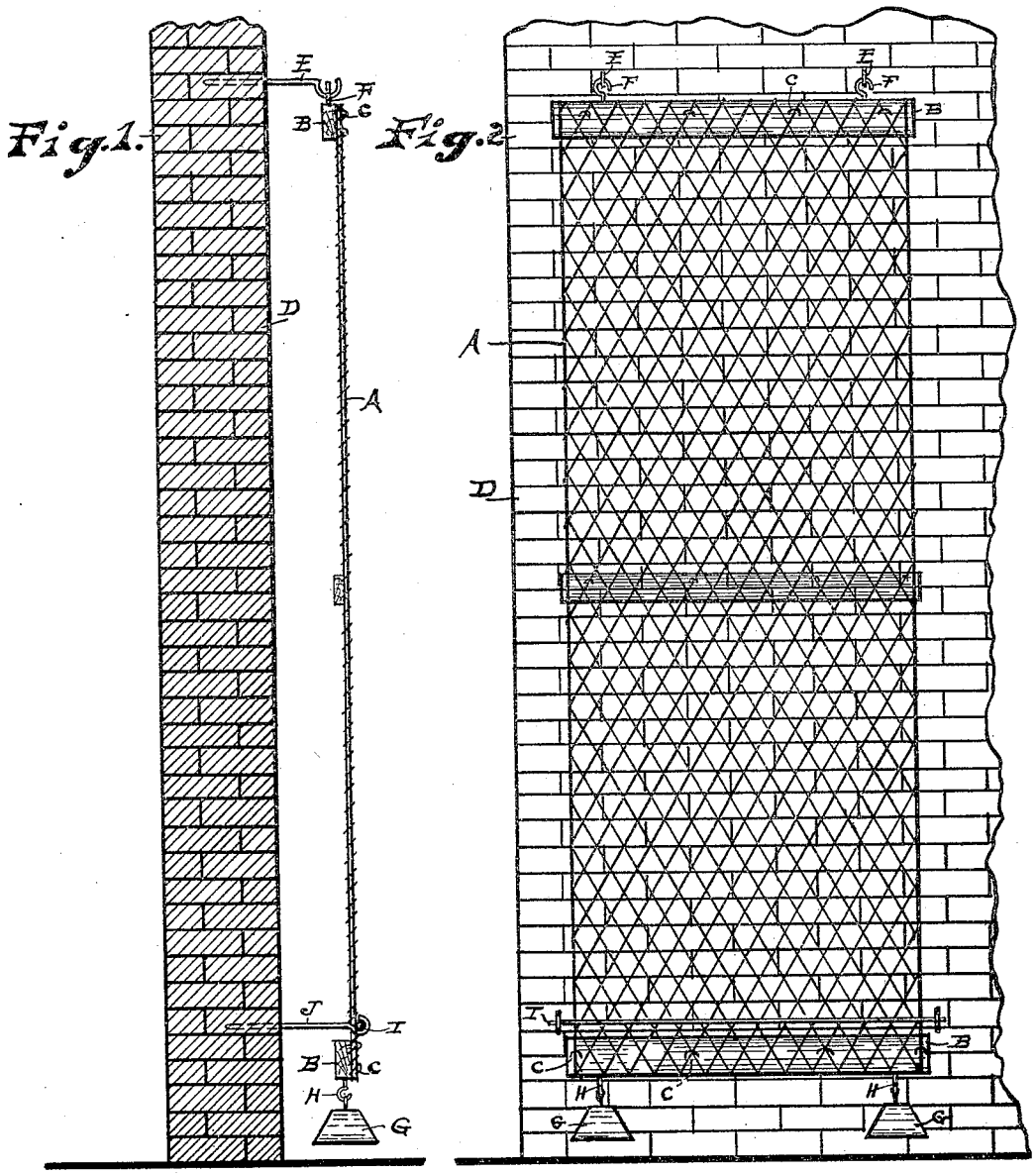
WITNESSES:
INVENTOR
Gerhard D. Basse
BY
Enwin & Wheeler
ATTORNEYS.

UNITED STATES PATENT OFFICE.

GERHARD D. BASSE, OF MILWAUKEE, WISCONSIN.

TRELLIS.

No. 824,227.  Specification of Letters Patent.  Patented June 26, 1906.

Application filed December 16, 1905. Serial No. 291,971.

*To all whom it may concern:*

Be it known that I, GERHARD D. BASSE, a citizen of the United States, residing at the city of Milwaukee, county of Milwaukee, and State of Wisconsin, have invented new and useful Improvements in Trellises, of which the following is a specification.

My invention relates to improvements in trellises for vines and other climbing plants.

The object of my invention is, among other things, first, to provide a trellis which may be temporarily attached to the side of a building or other suitable support for supporting vines and climbing plants during the summer season and which may at the close of the season be taken down from its support with the vines thereon, when the trellis and vines together may be rolled in a small compact bundle without removing or disengaging the vines from the ground, when both the vines and the trellis together may be covered up with leaves, straw, or other suitable material and thereby shielded from the injurious effects of the frost during the winter months, also by which when the proper time arrives the vines and trellis may be quickly unwound and again suspended in place from the walls of a building or other support.

A second object of my invention is to provide means for keeping the trellis taut and in a true vertical position, and, third, to provide means for preventing the lower end of the trellis from swinging.

The construction of my invention is explained by reference to the accompanying drawings, in which—

Figure 1 represents a side view, and Fig. 2 represents a front view, as it appears suspended from the wall of a building.

Like parts are identified by the same reference-letters in both views.

A represents the screen, which is preferably formed of flexible wire, which is woven together in the ordinary manner. The screen A is provided at its upper and lower ends with horizontal bars B B, which are secured thereto by a plurality of nails or staples C, and the same is suspended from the wall of a building D or other support by a plurality of hooks E E and F F, the hooks E being connected with the building and the hooks F with the edge of the upper bar B. The lower bar B is provided with a plurality of weights G, which are suspended therefrom by hooks H in any suitable manner. When the trellis has been completed, it is suspended from the building, as indicated in Figs. 1 and 2, and the weights G are connected with the lower bar B, as shown, whereby said trellis will be retained in a true vertical position and prevented from wrinkling or bending, as it might otherwise be caused to do by expansion or contraction, as said weights G serve to keep the same taut and prevent it from becoming warped or bent out of shape. To prevent the lower end of the trellis from swinging, I preferably connect the same with the wall D by the horizontal wire I and wire-retaining hooks J.

Thus it will be obvious that the trellis described may be readily and quickly attached to the wall of a building or other support and that to protect the vines which are suspended from the trellis it is necessary simply to disengage the hooks F from the hooks E and roll the trellis, together with the vines thereon, in a compact bundle around the upper bar B and placing the roll thus formed on the ground in close proximity to the roots of the vines, when the vines and the trellis may be properly covered, so as to shield them from the elements during the winter season. It will also be obvious that when desirous to secure the vines to the building it is necessary simply to unwind the trellis, together with the vines, and suspend the same, as before, from the hooks E, whereby the annoyances and trouble heretofore experienced in detaching the vines from the trellis in the fall of the year and replacing them in the spring is entirely overcome.

Having thus described my invention, what I claim as new, and desire to secure by Letters Patent, is—

1. The combination of a vine-supporting trellis, means for suspending the trellis from a wall, a plurality of weights and means for suspending said weights from the lower end of said trellis.

2. A trellis comprising a central flexible wire portion, rigid bars connected with the respective ends of said wire portion, a plurality of suspension-hooks for connecting the upper bar of said trellis with a supporting-wall, a plurality of weights and means for connecting said weights with the lower bar of said trellis, substantially as set forth.

3. The combination of a building-wall provided with a plurality of suspension-hooks a vine-supporting trellis comprising a central flexible wire portion, a horizontal bar affixed to the upper edge of said wire portion, a plurality of hooks affixed to said upper bar and adapted to engage the hooks which are connected with the wall, a horizontal bar affixed to the lower edge of said screen and a plurality of weights suspended from said lower horizontal bar.

4. The combination of a building-wall provided with a plurality of suspension-hooks a vine-supporting trellis comprising a central flexible wire portion and a plurality of horizontal bars, one of said bars being affixed at its upper edge and one at its lower edge and an additional bar or bars interposed between its upper and lower edge, a plurality of suspension-hooks attached to the upper horizontal bar and adapted to engage upon the suspension-hooks which are affixed to the wall, a plurality of weights suspended from the lower horizontal bar, a plurality of hooks affixed to the wall near the lower edge of said screen and a transverse rod connected with said lower hooks in front of said screen and adapted to prevent the same from swinging, all substantially as and for the purpose specified.

In testimony whereof I affix my signature in the presence of two witnesses.

GERHARD D. BASSE.

Witnesses:
 JAS. B. ERWIN,
 O. R. ERWIN